United States Patent [19]
LaBrecque et al.

[11] Patent Number: 5,370,001
[45] Date of Patent: Dec. 6, 1994

[54] ANGULAR MOMENTUM MASS FLOWMETER

[75] Inventors: Charles S. LaBrecque, Pelham, N.H.; Donald W. Craft, Melrose, Mass.

[73] Assignee: Ametek, Inc., New York, N.Y.

[21] Appl. No.: 74,953

[22] Filed: Jun. 2, 1993

[51] Int. Cl.⁵ .................................................. G01F 1/82
[52] U.S. Cl. ........................................................ 73/861.35
[58] Field of Search .......................... 73/861.35, 861.36

[56] References Cited

U.S. PATENT DOCUMENTS

| | | |
|---|---|---|
| 2,914,945 | 12/1959 | Cleveland . |
| 3,164,017 | 1/1965 | Karlby et al. . |
| 3,306,105 | 2/1967 | Ichihara et al. . |
| 3,613,451 | 10/1971 | Scott ................................. 73/861.35 |
| 3,877,304 | 4/1975 | Vetsch . |
| 4,012,957 | 3/1977 | Chiles et al. . |
| 4,248,099 | 2/1981 | Allen, Jr. et al. . |
| 4,438,648 | 3/1984 | Cheney, Jr. . |
| 4,858,474 | 8/1989 | Glasheen et al. . |
| 4,864,869 | 9/1989 | Glasheen . |

*Primary Examiner*—Herbert Goldstein
*Attorney, Agent, or Firm*—Amster, Rothstein & Ebenstein

[57] ABSTRACT

An angular momentum mass flowmeter for measuring the mass flowrate of a fluid stream includes a flowmeter housing having an inlet or upstream end for receiving the fluid stream and an outlet or downstream end for discharging the fluid stream. A rotatable impeller is provided for measuring the mass flowrate. A swirl cap is disposed downstream of the impeller for imparting angular momentum to the fluid stream passing thereover and for causing the angular momentum to rotate the impeller. A control valve, disposed intermediate the impeller and the swirl cap, modifies the flow area of the fluid stream passing over the swirl cap to regulate the angular momentum of the fluid stream.

11 Claims, 5 Drawing Sheets

ANGULAR MOMENTUM MASS FLOWMETER

BACKGROUND OF THE INVENTION

The present invention relates to an angular momentum mass flowmeter (AMMF) and more particularly to a fluid-driven AMMF.

An angular momentum mass flowmeter (AMMF) employs a motor- or fluid-driven device to impart a known angular velocity (and hence angular momentum) to the fluid flow to be measured relative to a rotating spring-restrained impeller. As the fluid flow impinges on the vanes of the impeller, the relative angular momentum of the fluid flow produces a torque on the impeller which is proportional to the mass flowrate of the fluid and the angular speed of the impeller. This relative angular momentum sensed by the impeller is interpreted as an indication of the mass flow rate of the fluid.

In some of the AMMF's, the angular momentum is created by an electrically powered device which introduces an angular fluid-flow component to the fluid flow, thereby instilling angular momentum. The modern AMMF's more frequently utilize the momentum of the incoming fluid flow to mechanically introduce an angular fluid-flow component thereto. Since the fluid-driven device does not require an electrical power source, it is generally preferred over the electric motor-driven device because of its lower cost and lower weight. The present invention is directed to an AMMF utilizing a fluid-driven device to generate the angular momentum.

More particularly, in a fluid-driven device the angular momentum is developed by the combined functions of a flow control valve and a swirl generator (or swirl cap) downstream thereof. The swirl generator defines a series of helical grooves about its periphery in order to give the fluid stream passing thereby a swirl velocity (i.e., an angular momentum) as the fluid passes through the helical grooves. The control valve defines a plurality of spring fingers which restrain the fluid flow so that, at the lower flow rates, all of the fluid flow passes through the helical grooves of the swirl generator. As the fluid-flow rate is increased, however, the pressure drop through the helical grooves increases, thereby creating an outward force on the spring fingers. At some point (approximately 1,000 pounds per hour of fluid flow), the outward force developed on the spring fingers is sufficient to lift the spring fingers off and away from the grooved surface of the swirl generator so that not all of the fluid flow enters the helical grooves. As flow is increased beyond this point, the plurality of spring fingers continue to open, thereby allowing an increasing portion of the fluid flow to bypass the helical grooves of the swirl generator. Thus the plurality of spring fingers essentially constitute a pressure-operated valve which uses the pressure drop across the swirl generator to regulate the amount of swirl imparted by the swirl generator to the fluid stream.

The position of the swirl generator relative to the spring fingers and the tension of the spring fingers are among the variables which may be controlled in order to ultimately control speed and "start-up" rates. The position of the spring fingers relative to the swirl generator provides a controlled angular speed of the fluid flow which acts on the downstream turbine vanes and minimizes the level of pressure drop in the fluid-drive section of the flowmeter at the higher fluid-flow rates.

In other words, the spring fingers act as a control valve to modify the flow area as a function of pressure drop in order to regulate the angular momentum of the fluid flow and the rate of rotation of the impeller.

The conventional AMMF produces the angular momentum in the fluid flow upstream of the torque-sensing element (i.e., the impeller). The drawback of the conventional AMMF which produces the angular momentum upstream of the torque-sensing element is that the changing flow-passage geometry (which is a function of the spacing between the spring fingers of the control valve and the swirl generator) alters the exit-flow profile from the swirl generator as a function of flow rate. The exit-flow profile can be described as having an average radius of gyration (r) about which fluid flows at a nominal rate and enters the passage of the impeller. The mass flow rate is directly related to the square of the average radius of gyration ($r^2$) of the flow exiting the impeller. As a result, the accuracy of the flowmeter is dependent upon the stability of the flow-velocity profile of flow entering the impeller. Where the fluid-driven device is disposed upstream of the impeller, changes in the velocity profile of fluid exiting the fluid-driven device influence the impeller located downstream thereof.

Accordingly, it is an object of the present invention to provide an AMMF wherein the fluid-drive device (that is, the swirl generator) is disposed downstream of the torque-sensing element (that is, the impeller).

Another object is to provide such a flowmeter wherein the variable flow profile associated with the fluid stream exiting the helical grooves of the swirl generator over the wide range of possible flow rates does not negatively affect the radius of gyration of the fluid flow through the impeller.

A further object is to provide such a flowmeter wherein the torsion spring is positioned for easy accessibility for repair or replacement, and the skew vane and a sensing coil are easily accessible for calibration purposes.

SUMMARY OF THE INVENTION

The above and related objects and features of the present invention are obtained in an angular momentum mass flowmeter (AMMF) for measuring the mass flow rate of a fluid stream. The flowmeter comprises a housing having an inlet or upstream end for receiving the fluid stream and an outlet or downstream end for discharging the fluid stream. Rotatable measuring means are provided for measuring the mass flowrate, as are means disposed downstream of the measuring means for imparting angular momentum to the fluid stream passing thereover and for causing the angular momentum to rotate the measuring means. A control valve means is disposed intermediate the measuring means and the momentum imparting means for modifying the flow area of the fluid stream passing over the momentum imparting means to regulate the angular momentum of the fluid stream.

In a preferred embodiment the flowmeter comprises a flowmeter housing for receiving a fluid stream, the mass flowrate of which is to be measured. A shaft extends axially through, and is rotatable relative to, the housing. A stationary flow conditioner is disposed in the housing adjacent the entry point of the flow stream thereinto and defines vaned passages for the fluid stream. A rotating impeller and shroud unit is disposed in the housing downstream of the flow conditioner. The shroud is secured to the shaft for rotation by and with the shaft as a unit, while the impeller defines vaned passages for the fluid stream and is resiliently linked to the shaft by a torsion spring for rotation by and with the shaft under steady state flow conditions. The torsion spring is secured at one end to the impeller and at an opposite end to the shaft. A stationary swirl cap is disposed in the housing downstream of the impeller and has a spherical surface defining helical grooves thereon for imparting angular momentum to the fluid stream passing thereover. A rotating turbine is disposed in the housing downstream of the swirl cap and defines vaned passages for the fluid stream, the turbine being rotated by the angular momentum of the fluid stream passing therethrough and the shaft being secured to the turbine for rotation by and with the turbine. A control valve means is disposed closely adjacent to and upstream of the swirl cap for modifying the flow area to regulate the angular momentum of the fluid stream leaving the swirl cap and hence the rate of rotation of the turbine. A first magnet is disposed on the impeller for rotation therewith, and a second magnet is disposed on the shroud for rotation therewith, the first and second magnets producing pulses and the lag between pulses being indicative of the mass flowrate of the fluid stream. Thus the fluid stream entering the housing passes successively through the flow conditioner passages, the impeller passages, over the swirl cap, and through the turbine passages in order to exit the housing.

Preferably the control valve means comprises a pressure-operated valve means responsive to the flowrate of the fluid stream therethrough to regulate the amount of angular momentum imparted by the swirl cap to the fluid stream passing thereover. More particularly the valve means comprises a plurality of spring fingers disposed upstream of the swirl cap and biased inwardly towards the swirl cap. The spring fingers retreat outwardly from the swirl cap in response to an increased flowrate of the fluid stream to lower the angular momentum imparted by the swirl cap to the fluid stream passing thereover. Optionally the disposition of the plurality of spring fingers is a variable distance upstream of the swirl cap.

The novel design of the flowmeter affords several advantages. The torsion spring is disposed substantially intermediate the flow conditioner and the impeller and shroud unit for easy access. The skew vane is disposed in the housing intermediate the flow conditioner and the impeller and shroud unit for modifying the angular momentum of the flow stream, the skew vane being disposed in longitudinal alignment with one of the vaned passages of the flow conditioner and being tiltable from outside the housing relative to the flow direction of the fluid stream. The flowmeter additionally includes sensing coils for detecting the movements of the first and second magnets, the coils being disposed on the housing coaxially with the shaft and at fixed radial distances from the impeller and shroud unit. Threaded engagement means are provided for arcuately circumferentially displacing one of the sensing coils relative to the other for calibration purposes without varying the radial distance thereof from the impeller and shroud unit.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
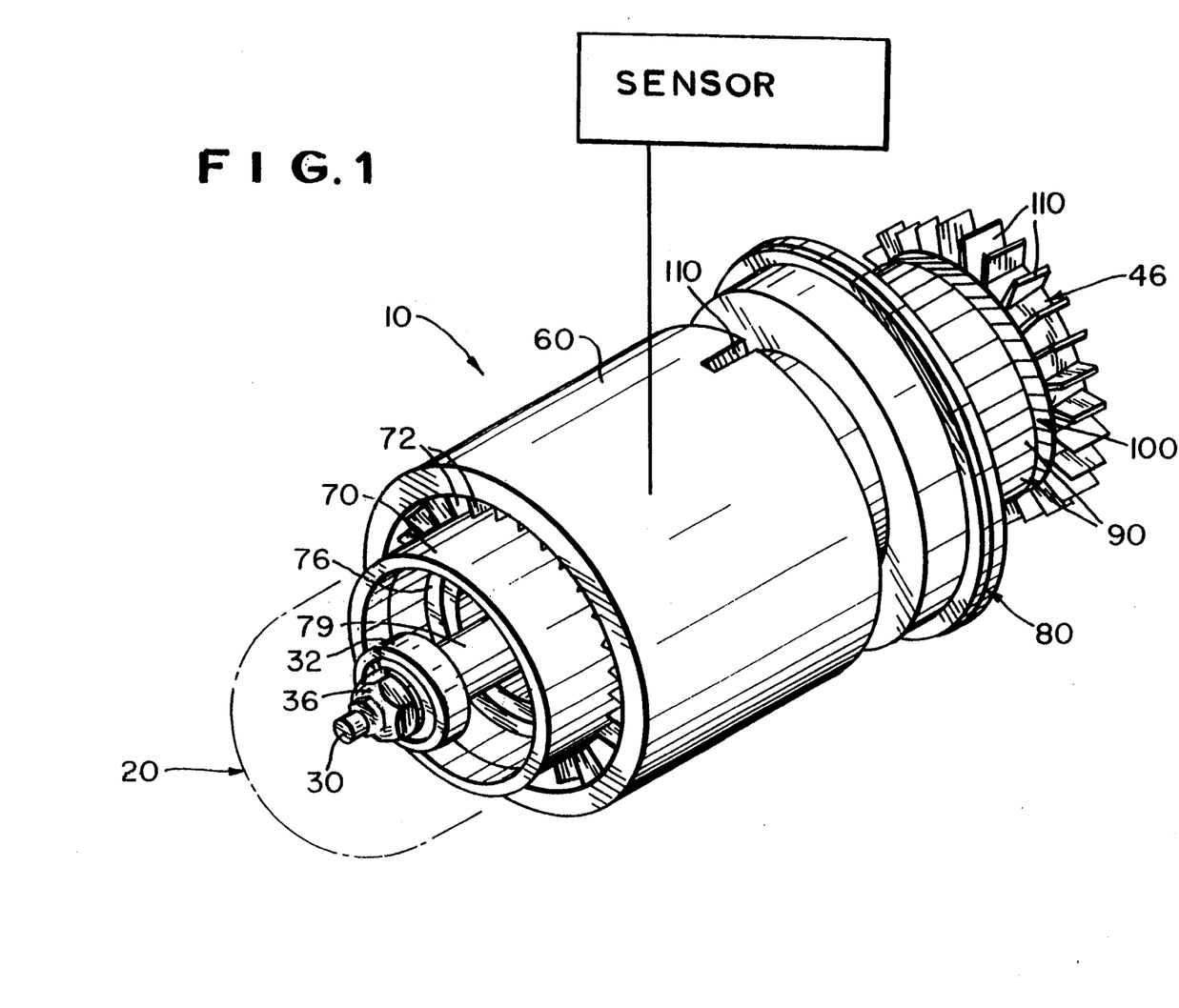
FIG. 1 is a fragmentary isometric view of a flowmeter according to the present invention, with the main and outlet housings and the inlet flow conditioner being removed to reveal details of internal construction.

Referring now to the drawings, and in particular to FIG. 1 thereof for an overview, therein illustrated is an angular mass momentum flowmeter according to the present invention, generally designated by reference numeral 10. The main and outlet housings have been removed to reveal details of internal construction.

The fluid flow to be measured enters into the flowmeter 10 through the inlet flow conditioner, generally designated 20. After being conditioned by the inlet flow conditioner 20, the flow passes through the vaned passages of an impeller 70 and a shroud 60 disposed about the impeller 70. While the shroud 60 is linked with a rotatable shaft 30 for rotation therewith as a unit, the impeller 70 is linked to the rotatable shaft 30 by a torsion spring 76 so that the impeller 70 rotates with the shaft 30 under steady-state conditions but lags behind the shaft 30 (and shroud 60) as a result of the presence of the fluid flow passing through the passages of the impeller 70. The degree of lag increases with increasing flow rates and decreases with decreasing flow rates. A magnet 110 is fixedly disposed in the shroud 60, and a magnet 112 (not shown in FIG. 1) is fixedly disposed on the impeller 70, so that the lag in rotation between the impeller 70 and the shroud 60 can be determined by appropriately positioning sensors 114, 116 (e.g., electrical sensing coils).

After passage intermediate the impeller 70 and shroud 60, the fluid flow passes through a strut and spring-finger assembly generally designated 80. The spring fingers 90 of the assembly 80 channel the fluid flow onto a swirl cap 100 defining on its outer surface a plurality of helical grooves 102 for imparting angular velocity or swirl to the fluid passing therethrough. The assembly 80 acts as a valve since the spring fingers 90 which funnel the fluid flow from the assembly 80 onto the swirl cap 100 tend to separate and open as the flow (and hence the back-pressure) of the fluid flow increases, so that less of the fluid flow is channeled into the helical grooves 102 and thus less swirl is imparted to the fluid flow.

The fluid flow from the swirl cap 100 passes through and rotates the turbine 46 and then exits the flowmeter 10. Turbine 46 is secured to the rotatable shaft 30 so that rotation of the turbine 46 causes a like rotation of the shaft 30. As earlier noted, the shroud 60 rotates with the shaft 30, and the impeller 70 rotates with the shaft 30 under the steady-state conditions.

Figure 2:
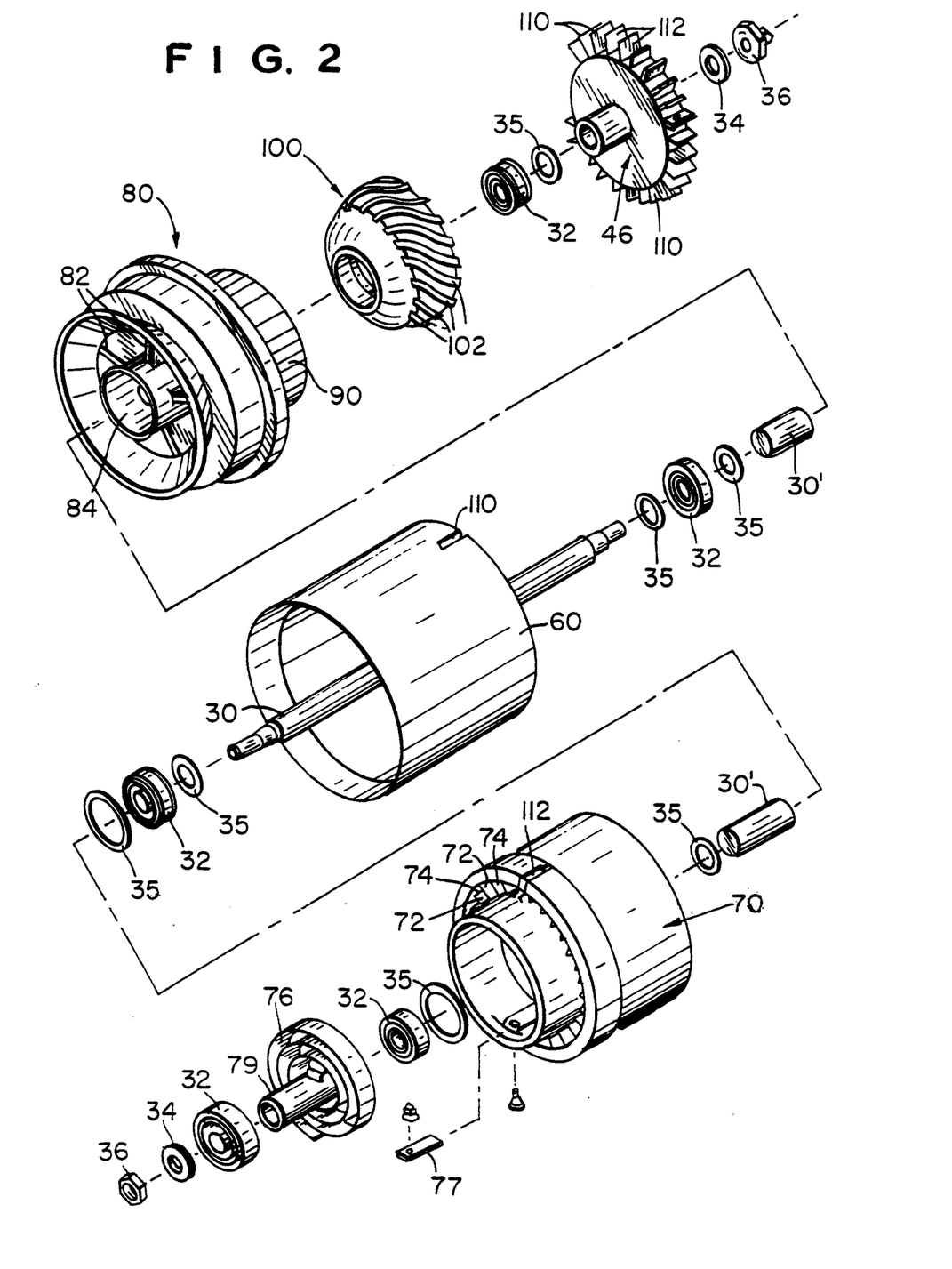
FIG. 2 is an exploded isometric view thereof.
Figure 3:
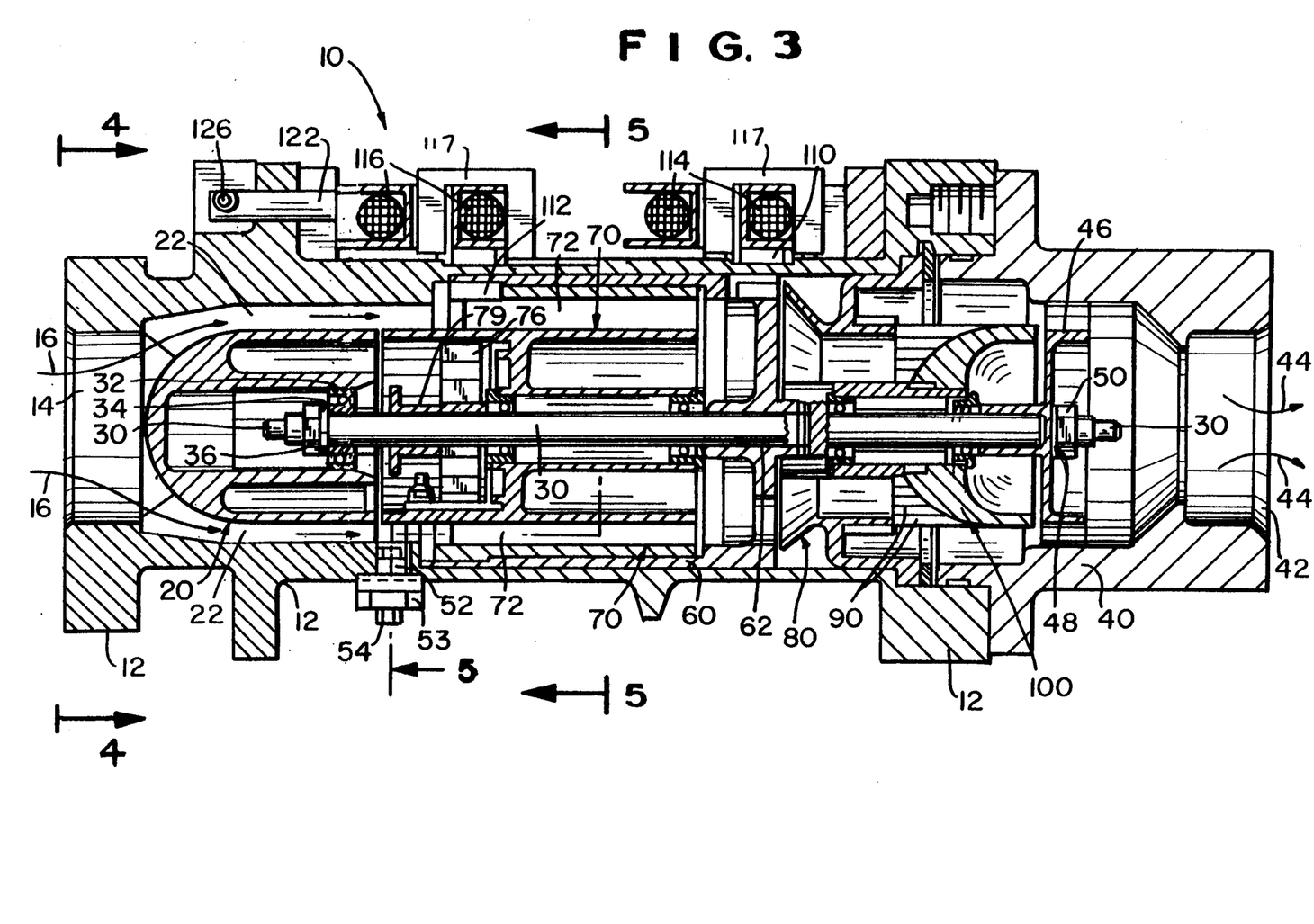
FIG. 3 is a side elevational view of the flowmeter.

Referring now to FIGS. 2 and 3 in particular, therein illustrated is the complete angular momentum mass flowmeter 10 according to the present invention. The main housing 12 of the flowmeter 10 defines an inlet 14 through which the fluid flow to be measured enters, as indicated by the arrows 16 traveling from left to right in FIG. 3. Disposed along the longitudinal axis of the housing 12 is a stationary (non-rotatable) inlet flow conditioner, generally designated 20, defining radial vanes 22 and vaned passages 24 through which the fluid flow passes so as to eliminate any non-longitudinal component thereof.

A rotatable shaft 30 is disposed along the longitudinal axis of the housing 12. The shaft front end is mounted in the inlet flow conditioner 20 (not shown in FIG. 2) by means of a ball bearing 32, a washer 34 and a locknut 36, and the shaft rear end is mounted in an outlet housing 40 defining a fluid-flow outlet 42 through which the fluid flow exits from the flowmeter 10, as indicated by arrows 44. More particularly, the rear end of the rotatable shaft 30 is disposed in a turbine 46 and is secured thereto by means of a washer 34 and a locknut 36. Throughout the length of the rotatable shaft 30 (which operatively includes various spacers 30' to enable axial play), additional support is provided by various flanged ball bearings 32 surrounded by shim washers 35.

A hollow, cylindrical shroud 60 and an impeller of smaller diameter, generally designated 70, are concentrically mounted on the rotatable shaft 30. The impeller 70, like the inlet conditioner 20, defines a plurality of radial vanes 72 and vaned passages 74 through which the fluid flow passes. Whereas the shroud 60 is directly connected to the rotatable shaft 30 at 62 for rotation therewith as a unit, the impeller 70 is connected to the shaft 30 by a torsion spring 76, which has its inner end connected to the rotatable shaft 30 for rotation therewith as a unit by a hub 79 and its outer end attached to the impeller 70 for rotation therewith as a unit by a spring clamp 77 (see FIG. 2). Accordingly, under steady-state conditions, the impeller 70 rotates with the rotatable shaft 30. The presence of the fluid stream passing through the vaned passages 74 in the impeller 70 causes the rotation of the impeller 70 to lag behind the rotation of the rotatable shaft 30 and shroud 60, the degree of lag increasing with increasing flow rates and decreasing with decreasing flow rates.

It will be appreciated that, contrary to conventional design which places the torsion spring 76 in a "nested" disposition between two rotating components (i.e., the impeller 70 and the shroud 60), the design of the present invention locates the torsion spring 76 on the inlet or front ends of the impeller 70 and the shroud 60, thereby to simplify access to the torsion spring 76, as necessary when the torsion spring 76 must be replaced or its length adjusted. Instead of the conventional extensive disassembly required for access to the torsion spring 76, essentially only removal of the outlet housing 40 followed by removal of the shaft 30 and the elements attached thereto is required in order to enable access to the torsion spring 76.

The skew vane 52 is a single vane disposed along the length of the flowmeter intermediate the impeller 70 and the inlet flow conditioner 20 and along the circumference of the flowmeter between a pair of the flow-conditioner vanes 22. The position of the vane 52 relative to the direction of fluid flow determines whether the fluid torque which will measured by the impeller 70 is increased or decreased. The vane position can be adjusted to correct for errors initiated by surface imperfections of the vanes of the inlet flow conditioner 20 or the impeller 70, which might otherwise result in a false indication of the flow rate. The effect of the skew vane 52 is proportional to the square of the mass flow rate through the impeller 70. Access to the vane is enabled by loosening a removable cover 54 which is secured over a port 55 penetrating the main housing 12. The cover is removably fastened to the housing 12 by means of a pair of screws 56. A radial elastomeric seal 58 is deployed in port 55 to preclude fluid leakage therethrough. The port 55 permits the skew vane 52 to be appropriately oriented, for example, via a hexagonal socket or screwdriver slot.

This positioning of the skew vane 52 represents an improvement over the conventional skew vane design wherein the skew vane is disposed within the inlet flow conditioner 20 and in line with a vane 20 thereof. The longitudinal disposition of the skew vane 52 intermediate the flow conditioner 20 and the impeller 70 according to the present invention allows the skew vane 52 a greater adjustment range since it is not restricted within vaned passages 24 of the inlet flow conditioner 20. The circumferential disposition of the skew vane 52 between two adjacent flow-conditioner vanes 22 according to the present invention makes the skew vane 52 less sensitive to misalignment than the conventionally positioned skew vane which must theoretically be in perfect alignment with a flow-conditioner vane 22 in order to avoid secondary flow effects which might result from the skew vane becoming misaligned and having the effect of staggering the flow-conditioner vane 22.

Disposed downstream of the impeller 70/shroud 60 assembly is a strut and spring-finger assembly generally designated 80. The assembly 80 is non-rotatably disposed about the shaft 30 by means of struts 82 and a sleeve 84, the position of the assembly 80 along the longitudinal axis of the rotatable shaft 30 optionally being adjustable. The downstream end of assembly 80 defines a plurality of spring fingers 90 which funnel the fluid flow from the assembly 80 onto a swirl cap or swirl generator, generally designated 100.

The swirl cap 100 is non-rotatably disposed in the outlet housing 40 and defines a plurality of helical grooves 102 machined about the outer spherical surface thereof, the helical grooves 102 imparting an angular velocity or swirl to the fluid passing therethrough. The degree of swirl or angular velocity imparted to the fluid flow by the helical grooves 102 of the swirl cap 100 will depend upon the longitudinal closeness of the assembly 80 and the radial closeness of the spring fingers 90. As the fluid flow increases, the pressure on the spring fingers 90 tends to force them radially outwardly so that less of the fluid flow is channeled through the helical grooves 102 and thus less swirl is imparted to the fluid flow, and vice versa. Thus, the spring fingers 90 of assembly 80 work as control valves to modify the flow area (that is, the flow profile) as a function of pressure drop across the swirl cap 100, thereby to regulate the angular momentum and the rate of rotation of the sensing element 70. Similarly, the longitudinal position of the assembly 80 relative to the swirl cap 100 may be manually adjusted, with increasing longitudinal separation between the two decreasing the effect of the helical grooves 102 of swirl cap 100 in imparting swirl to the fluid flow, and vice versa.

Downstream of the swirl cap 100, the turbine 46 with its radial vanes 110 and vaned passages 112 receives the fluid flow exiting the swirl cap 100. The fluid flow has an angular velocity (as a result of passage over swirl cap 100) and thus imparts rotation to the turbine 46. The vanes 110 of the turbine 46 may be straight or contoured, as desired for particular applications. The rotatable shaft 30 is secured to the turbine 46 for rotation therewith as a unit, so that the rotation of the turbine 46 in response to the fluid flow results in a rotation of the rotatable shaft 30. The rotation of turbine 46 is in turn imparted via shaft 30 to shroud 60 and impeller 70. Thus no electrical power input is required to provide rotation of the impeller 70 and shroud 60 of the flowmeter of the present invention, all necessary mechanical power for rotation of the shaft 30 and related components being obtained from the momentum of the fluid flow through the turbine 46.

In order to generate an electrical output signal indicative of the mass flow rate, the shroud 60 (which rotates as a unit with the shaft 30) is provided with a permanent magnet 110, and the impeller 70 (which rotates with the shaft 30 under steady-state conditions) is provided with a separate permanent magnet 112. Disposed on the outer surface of the main housing 12 transverse to the axis of shaft 30 are two separate pick-off or sensing coils 114, 116, each disposed about a magnetically-permeable core 117: a start coil 114 which is radially disposed relative to the shroud magnet 110, and a stop coil 116 which is radially disposed relative to the impeller magnet 112. As the magnets 110, 112 rotate with the shaft 30 relative to the coils 114, 116, respectively, the magnets 110, 112 produce sinusoidal pulse wave forms in their respective radially aligned coils 114, 116. The interaction of the shroud magnet 110 and its associated start coil 114 produces a "start" electrical pulse each time the magnet 110 passes the magnetically-permeable core of the coil 114, just as the interaction of the impeller magnet 112 with its associated stop coil 116 produces a "stop" electrical pulse each time the magnet 112 passes the magnetically-permeable core of the coil 116. The time elapsed between the "start" and "stop" pulses is directly related to the mass rate of fluid flow—that is, the lag of the impeller 70 relative to the shroud 60.

Figure 4:
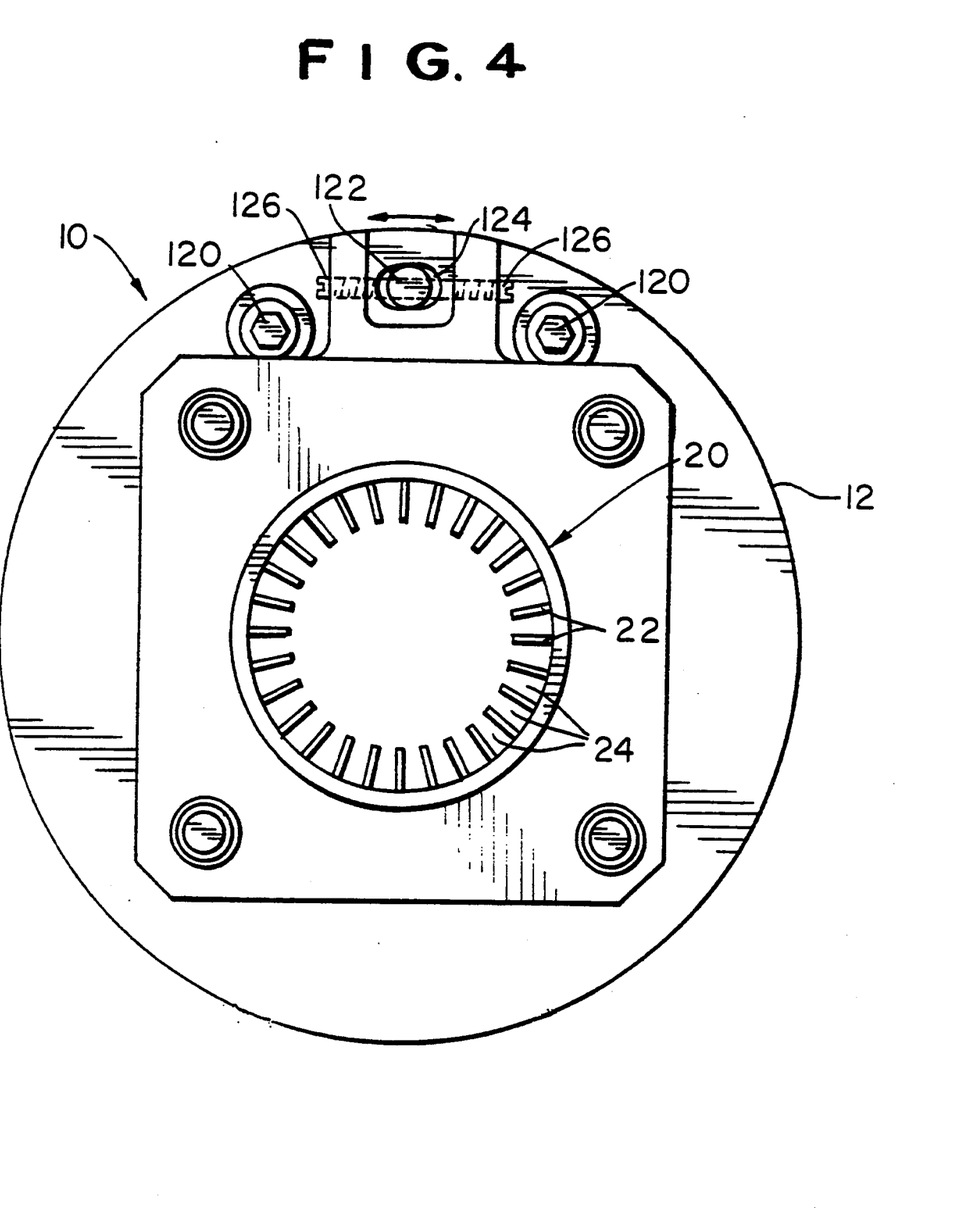
FIG. 4 is a front end elevational view taken along the line 4—4 of FIG. 3.
Figure 5:
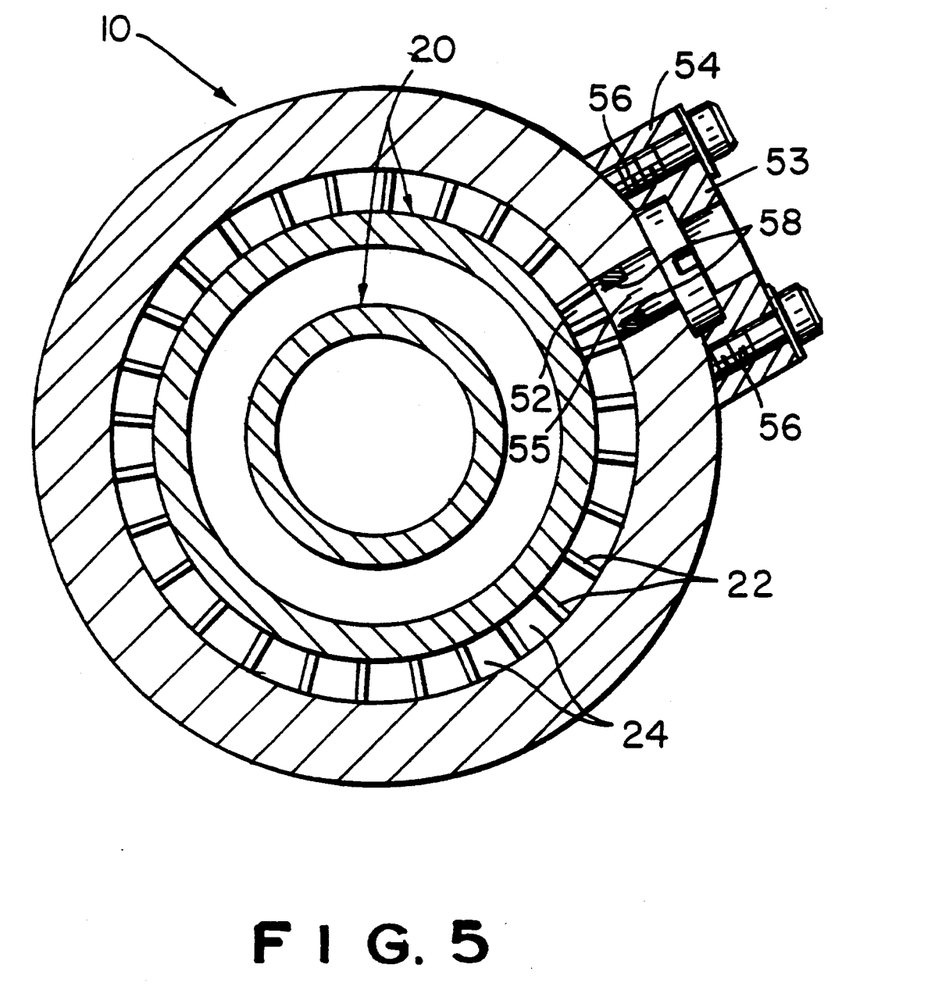
FIG. 5 is a sectional view taken along the line 5—5 of FIG. 3.

It will be appreciated that a movement of either of the two sensing coils 114, 116 with respect to the other will result in a change in timing for the "zero" flow position. Accordingly, the present invention provides a precise method for adjusting the angular position of the stop coil 116 relative to the start coil 114 such that the adjustment cannot be accidentally lost during the life of the unit. Referring now to FIG. 4 in particular, two screws 120 attach the stop coil 116 to the main housing 12. When the two screws securing the stop coil 116 are loosened, the stop coil 116 is permitted limited circumferential movement about the axis of the housing 12. A pin 122 is secured to and protrudes from the stop coil 116 and is disposed within an arcuate slot 124 in the housing 12. Two screws 126 are threaded into the housing 12 and bear against the pin 122 from opposite directions, thereby to enable movement of the pin 122 in either direction along an arc centered about the housing axis. To provide for the desired zero-timing adjustment, the screws 126 may be adjusted to appropriately fix the pin 122, and thus the disposition of the stop coil 116 once the mounting screws 120 have been loosened. Once the desired adjustment is made using adjustment screws 126, the mounting screws 120 are re-tightened, after which the adjustment screws 126 may be loosened or even removed as they are no longer required since the mounting screws 120 now fix the position of the stop coil 116 relative to the housing 12. The aforementioned mechanical control provides a simple mechanism which enables a more accurate and sensitive adjustment than in the conventional flowmeter. If preferred, the start coil 114 may be made adjustable rather than the stop coil 116. As an option, two shoulder screws can take the place of screws 126 and pin 122, to provide the functions of securement and maintenance of a constant arc.

In the conventional flowmeter, the zero adjustment is provided by loosening lock-down screws to enable the operator to relocate one or both of the signal sensing coils 114, 116 to either delay or advance the signal occurrence. However, the degree of control by which this adjustment is made is dependent upon the direct control and sensitivity which the operator can apply by hand. On the other hand, the present invention provides a mechanical control for relative relocation of the sensing coils 114, 116 which reduces the dependency on operator skill. Further, the adjustment mechanism maintains the signal magnet 110, 112 to signal coil 114, 116 airgap throughout the adjustment range, thereby maintaining a constant signal amplitude.

Now that the preferred embodiments of the present invention have been described in detail, various modifications and improvements thereon will become readily apparent to those skilled in the art. Accordingly, the spirit and scope of the present invention is to be construed broadly and limited only by the appended claims, and not by the foregoing specification.

We claim:

1. An angular momentum mass flowmeter for measuring the mass flowrate of a fluid stream, comprising:
    (A) a flowmeter housing having an inlet or upstream end for receiving the fluid stream and an outlet or downstream end for discharging the fluid stream;
    (B) rotatable measuring means for measuring the mass flowrate;
    (C) means disposed downstream of said measuring means for imparting angular momentum to the fluid stream passing thereover and for causing the angular momentum to rotate said measuring means; and
    (D) control valve means, disposed intermediate said measuring means and said momentum imparting means, for modifying the flow area of the fluid stream passing over said momentum imparting means to regulate the angular momentum of the fluid stream;
    said momentum imparting means being non-rotatable relative to said housing, operating independently of said measuring means, and being separable from said measuring means without disturbing the calibration thereof.

2. An angular momentum mass flowmeter comprising:
    (A) a flowmeter housing for receiving a fluid stream, the mass flowrate of which is to be measured;
    (B) a shaft extending axially through and rotatable relative to said housing;
    (C) a stationary flow conditioner disposed in said housing adjacent the entry point of the flow stream thereinto and defining vaned passages for the fluid stream;
    (D) a rotating impeller and shroud unit disposed in said housing downstream of said flow conditioner, said shroud being secured to said shaft for rotation by and with said shaft as a unit, said impeller defining vaned passages for the fluid stream and being resiliently linked to said shaft by a torsion spring for rotation by and with said shaft under steady state flow conditions, said torsion spring being secured at one end to said impeller and at an opposite end to said shaft;

(E) a stationary swirl cap disposed in said housing downstream of said impeller and having a spherical surface defining helical grooves thereon for imparting angular momentum to the fluid stream passing thereover;

(F) a rotating turbine disposed in said housing downstream of said swirl cap and defining vaned passages for the fluid stream, said turbine being rotated by the angular momentum of the fluid stream passing therethrough, said shaft being secured to said turbine for rotation by and with said turbine;

(G) control valve means disposed closely adjacent to and upstream of said swirl cap for modifying the flow area to regulate the angular momentum of the fluid stream leaving the swirl cap and hence the rate of rotation of said turbine; and (H) a first magnet disposed on said impeller for rotation therewith and a second magnet disposed on said shroud for rotation therewith, said first and second magnets producing pulses and the lag between pulses being indicative of the mass flowrate of the fluid stream;

whereby said fluid stream entering said housing passes successively through said flow conditioner passages, said impeller passages, over said swirl cap, and through said turbine passages in order to exit said housing.

3. The flowmeter of claim 2 wherein said control valve means comprises a pressure-operated valve means responsive to the flowrate of the fluid stream therethrough to regulate the amount of angular momentum imparted by said swirl cap to the fluid stream passing thereover.

4. The flowmeter of claim 3 wherein said valve means comprises a plurality of spring fingers disposed upstream of said swirl cap and biased inwardly towards said swirl cap.

5. The flowmeter of claim 4 wherein said spring fingers retreat outwardly from said swirl cap in response to an increased flowrate of the fluid stream to lower the angular momentum imparted by said swirl cap to the fluid stream passing thereover.

6. The flowmeter of claim 4 wherein the disposition of said plurality of spring fingers is a variable distance upstream of said swirl cap.

7. The flowmeter of claim 2 wherein said torsion spring is disposed substantially intermediate said flow conditioner and said impeller and shroud unit for easy access.

8. The flowmeter of claim 2 additionally including sensing coils for detecting the movements of said first and second magnets, said coils being disposed on said housing coaxially with said shaft and at fixed radial distances from said impeller and shroud unit, and threaded engagement means for arcuately circumferentially displacing one of said sensing coils relative to the other for calibration purposes without varying the radial distance thereof from said impeller and shroud unit.

9. The flowmeter of claim 2 additionally including a skew vane disposed in said housing intermediate said flow conditioner and said impeller and shroud unit for modifying the angular momentum of the flow stream, said skew vane being disposed in longitudinal alignment with one of said vaned passages of said flow conditioner and being tiltable from outside the housing relative to the flow direction of the fluid stream.

10. An angular momentum mass flowmeter comprising:

(A) a flowmeter housing for receiving a fluid stream, the mass flowrate of which is to be measured;

(B) a shaft extending axially through and rotatable relative to said housing;

(C) a stationary flow conditioner disposed in said housing adjacent the entry point of the flow stream thereinto and defining vaned passages for the fluid stream;

(D) a rotating impeller and shroud unit disposed in said housing downstream of said flow conditioner, said shroud being secured to said shaft for rotation by and with said shaft as a unit, said impeller defining vaned passages for the fluid stream and being resiliently linked to said shaft by a torsion spring for rotation by and with said shaft under steady state flow conditions, said torsion spring being secured at one end to said impeller and at an opposite end to said shaft;

(E) a stationary swirl cap disposed in said housing downstream of said impeller and having a spherical surface defining helical grooves thereon for imparting angular momentum to the fluid stream passing thereover;

(F) a rotating turbine disposed in said housing downstream of said swirl cap and defining vaned passages for the fluid stream, said turbine being rotated by the angular momentum of the fluid stream passing therethrough, said shaft being secured to said turbine for rotation by and with said turbine;

(G) control valve means disposed closely adjacent to and upstream of said swirl cap for modifying the flow area to regulate the angular momentum of the fluid stream leaving the swirl cap and hence the rate of rotation of said turbine; said control valve means including a pressure-operated valve means responsive to the flowrate of the fluid stream therethrough to regulate the amount of angular momentum imparted by said swirl cap to the fluid stream passing thereover, said valve means defining a plurality of spring fingers disposed upstream of said swirl cap and biased inwardly towards said swirl cap, said spring fingers retreating outwardly from said swirl cap in response to an increased flowrate of the fluid stream to lower the angular momentum imparted by said swirl cap to the fluid stream passing thereover; and (H) a first magnet disposed on said impeller for rotation therewith and a second magnet disposed on said shroud for rotation therewith, said first and second magnets producing pulses and the lag between pulses being indicative of the mass flowrate of the fluid stream;

whereby said fluid stream entering said housing passes successively through said flow conditioner passages, said impeller passages, over said swirl cap, and through said turbine passages in order to exit said housing.

11. The flowmeter of claim 10 wherein said torsion spring is disposed substantially intermediate said flow conditioner and said impeller and shroud unit for easy access, said flowmeter additionally includes sensing coils for detecting the movements of said first and second magnets, said coils being disposed on said housing coaxially with said shaft and at fixed radial distances from said impeller and shroud unit, threaded engagement means for arcuately circumferentially displacing one of said sensing coils relative to the other for calibration purposes without varying the radial distance thereof from said impeller and shroud unit, and a skew vane disposed in said housing intermediate said flow conditioner and said impeller and shroud unit for modifying the angular momentum of the flow stream, said skew vane being disposed in longitudinal alignment with one of said vaned passages of said flow conditioner and being tiltable from outside the housing relative to the flow direction of the fluid stream.

* * * * *